United States Patent
Charbit et al.

(10) Patent No.: US 9,363,847 B2
(45) Date of Patent: Jun. 7, 2016

(54) METHOD AND APPARATUS FOR PROVIDING FOR DISCONTINUOUS RECEPTION VIA CELLS HAVING DIFFERENT TIME DIVISION DUPLEX SUBFRAME CONFIGURATIONS

(75) Inventors: Gilles Charbit, Farnborough (GB); Jing Han, Beijing (CN); Haiming Wang, Beijing (CN); Wei Bai, Beijing (CN); Erlin Zeng, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 128 days.

(21) Appl. No.: 14/111,344

(22) PCT Filed: Apr. 11, 2011

(86) PCT No.: PCT/CN2011/072595
§ 371 (c)(1),
(2), (4) Date: Oct. 11, 2013

(87) PCT Pub. No.: WO2012/139272
PCT Pub. Date: Oct. 18, 2012

(65) Prior Publication Data
US 2014/0036742 A1     Feb. 6, 2014

(51) Int. Cl.
| | |
|---|---|
| H04W 72/12 | (2009.01) |
| H04W 76/04 | (2009.01) |
| H04L 5/14 | (2006.01) |
| H04W 52/02 | (2009.01) |
| H04B 3/00 | (2006.01) |
| H04L 5/00 | (2006.01) |

(52) U.S. Cl.
CPC ............ *H04W 76/048* (2013.01); *H04L 5/14* (2013.01); *H04W 52/0235* (2013.01); *H04W 72/1263* (2013.01); *H04B 3/00* (2013.01); *H04L 5/0094* (2013.01)

(58) Field of Classification Search
CPC ... H04W 76/048; H04W 48/16; H04W 24/10; H04W 72/0453; H04W 72/1263; H04L 27/2601; H04L 67/303; H04L 5/0094; H04L 5/14; H04B 7/0891; H04B 3/00; H04N 2201/33364
See application file for complete search history.

(56) References Cited

U.S. PATENT DOCUMENTS

| | | | | |
|---|---|---|---|---|
| 2010/0322173 | A1* | 12/2010 | Marinier | H04W 76/048 370/329 |
| 2012/0207040 | A1* | 8/2012 | Comsa | H04W 72/1215 370/252 |
| 2014/0016594 | A1* | 1/2014 | Han | H04L 5/001 370/329 |
| 2014/0036738 | A1* | 2/2014 | Kim | H04J 3/1694 370/280 |

FOREIGN PATENT DOCUMENTS

| | | |
|---|---|---|
| WO | 2009132290 A2 | 10/2009 |
| WO | 2010148192 A1 | 12/2010 |
| WO | 2010148930 A1 | 12/2010 |

OTHER PUBLICATIONS

3GPP, "TS 36.321 v.10.1.0", Apr. 2011, pp. 32-44.*

* cited by examiner

*Primary Examiner* — Jeffrey M Rutkowski
*Assistant Examiner* — Salvador E Rivas
(74) *Attorney, Agent, or Firm* — Oblon, McClelland, Maier & Neustadt, L.L.P

(57) ABSTRACT

Methods and apparatus are disclosed that facilitate discontinuous reception via a primary cell and one or more secondary cells that have different TDD UL/DL subframe configurations including overlapping subframes, such as in an instance in which a UL subframe of a secondary cell overlaps with a corresponding DL subframe of the primary cell. A method may define an active state of a primary cell to be larger than an active state of a secondary cell in a TDD network that supports carrier aggregation. The method may also provide for discontinuous reception via the primary cell and the secondary cell in accordance with different TDD UL/DL subframe configurations and also in accordance with the respective active states of the primary and secondary cells.

19 Claims, 15 Drawing Sheets

METHOD AND APPARATUS FOR PROVIDING FOR DISCONTINUOUS RECEPTION VIA CELLS HAVING DIFFERENT TIME DIVISION DUPLEX SUBFRAME CONFIGURATIONS

TECHNOLOGICAL FIELD

Embodiments of the present invention relate generally to communications technology and, more particularly, to methods and apparatus for providing for discontinuous reception via a primary cell and one or more secondary cells that have different time division duplex (TDD) uplink (UL)/downlink (DL) subframe configurations.

BACKGROUND

Carrier aggregation is a combination of two or more cells or component carriers (CCs) operating at different frequencies in order to provide a broader transmission bandwidth for a mobile terminal. Depending upon its capabilities, a mobile terminal may simultaneously receive or transmit on one or more of the cells. The cells aggregated in accordance with carrier aggregation include a primary cell and one or more secondary cells. The primary cell is the cell that: (i) operates on a primary carrier in which the mobile terminal either performs the initial connection establishment procedure or initiates the connection re-establishment procedure, or (ii) was indicated as the primary cell in a handover procedure. Conversely, a secondary cell is a cell, operating on a secondary carrier, which may be configured once radio resource control (RRC) is established and which may be used to provide additional radio resources.

Although the focus to date has been principally upon frequency division duplex (FDD) networks, time division duplex (TDD) networks that support carrier aggregation must also be considered. Indeed, in a TDD network, the primary cell and the secondary cells may have respective TDD uplink (UL)/downlink (DL) subframe configurations. In Long Term Evolution (LTE) release 10, mobile terminals that support TDD signaling are required to operate in accordance with a TDD UL/DL subframe configuration that is aligned and consistent across the primary and secondary cells that are to be aggregated. Additionally, LTE release 10 required that common discontinuous reception (DRX) parameters be utilized for each of the primary and secondary cells such that the active time and the DRX pattern would be the same for each of the aggregated cells.

For mobile terminals configured in accordance with LTE release 11, however, the primary and secondary cells are permitted to have different TDD UL/DL subframe configurations. These different TDD UL/DL subframe configurations may be useful in order to allow a cell to be compatible with a neighbor legacy TDD system, such as a Time Division Synchronous Code Division Multiple Access (TD-SCDMA) system, for which multiple cells having aligned TDD UL/DL subframe configurations are not available. Additionally, primary and secondary cells having different TDD UL/DL subframe configurations may provide different amounts of resources and a different DL/UL ratio for the mobile terminal. For example, the use of different TDD UL/DL subframe configurations by the primary and secondary cells in LTE release 11 may permit different ones of the cells to provide different coverage by, for example, enabling more UL subframes in a lower frequency cell to enlarge the coverage. The ability to provide different amounts of resources and a different DL/UL ratio may be of particular importance to a mobile terminal that utilizes carrier aggregation since carrier aggregation is oftentimes utilized in an instance in which the mobile terminal has a relatively large amount of data to transmit, thereby increasing the importance of defining the TDD UL/DL subframe configurations of the primary and secondary cells so as to provide a suitable DL/UL ratio and to otherwise efficiently utilize the communication resources.

By allowing the primary and secondary cells to have different TDD UL/DL subframe configurations, however, the different TDD UL/DL subframe configurations of the primary and secondary cells may have overlapped subframes in some instances, such as by one of the cells having a DL subframe at a specific instance in time while another cell has an UL subframe. An example of the TDD UL/DL subframe configuration of a primary cell and a secondary cell is shown in FIG. 1. In this example, subframe 3 is overlapping in that subframe 3 of the primary cell is a UL subframe, while subframe 3 of the secondary cell is a DL subframe.

The mobile terminal could be configured to provide for simultaneous reception and transmission so as to accommodate overlapping subframes. While the simultaneous transmission and reception would permit all subframes to be utilized and would avoid missing any transmission and reception opportunities, a mobile terminal having simultaneous transmission and reception capabilities for TDD signaling would require a duplex filter which would disadvantageously add to the complexity of the TDD implementation of the mobile terminal. As an alternative to configuring the mobile terminal to allow for simultaneous transmission and reception, the mobile terminal could, instead, only process one of the overlapping subframes with the other of the overlapping subframes being blocked or otherwise ignored.

The overlapping subframes may also increase the complexity with which various DRX parameters are defined. In this regard, DRX parameters, such as the on-duration timer, the inactivity timer and the retransmission timer, are defined in terms of the number of Physical Downlink Control Channel (PDCCH) subframes. In this regard, a PDCCH subframe in a TDD system is defined in LTE releases 8, 9 and 10 as either a DL subframe, e.g., the subframes designated D in FIG. 1, or a special subframe, e.g., the subframes designated S in FIG. 1. In an instance in which the TDD UL/DL subframe configurations of the primary and secondary cells have overlapping subframes, however, the DRX parameters that are defined in terms of a number of PDCCH subframe may be somewhat unclear since the primary and secondary cells may have different numbers of PDCCH subframes as a result of the overlapping subframes. By way of example, a PDCCH subframe could be defined as a subframe having at least one DL subframe or special subframe in any of the corresponding subframes, e.g., the subframes aligned in time, of the primary and secondary cells. Unfortunately, this definition of a PDCCH subframe may create an imbalance in the monitoring of the different cells and create additional complexity for the base station which may find it difficult to control the DRX pattern.

As shown in FIG. 2, for example, an on-duration timer may be defined to equal 4 PDCCH subframes (PSF). Based upon the definition of a PDCCH subframe as a subframe that is either a DL subframe or a special subframe in any of the corresponding subframes of the primary and secondary cells, the mobile terminal may maintain an active state for the first 5 subframes (including 4 PDDCH subframes and an UL subframe) and may then become inactive. As such, a downlink grant for the primary cell that arrived during subframe 6 will not be acted upon since the mobile terminal is in an inactive state even though the TDD UL/DL subframe configuration of the primary cell includes only 2 PDCCH subframes, namely, 1 DL subframe and 1 S subframe, during the active time period. As such, the mobile terminal in this example would not have the same chance to capture the scheduling grant on each of the primary and secondary cells, which impairs one of the objectives of carrier aggregation, namely, load balancing.

Additionally, the definition of the PDCCH subframe as a subframe that is either a DL subframe or a special subframe in the TDD UL/DL subframe configurations for any of the primary and secondary cells may also cause the different cells to have different numbers of retransmission opportunities as shown in FIG. 3. By way of example, a retransmission timer (Rx timer) may have a value of 2 PDCCH subframes following a Hybrid Automatic Request Round Trip Time (as denoted by the RTT timer of FIG. 3) of 7 PDCCH subframes. As shown in FIG. 3, the retransmission period may last for only two subframes since the secondary cell includes 2 DL subframes following the start of the retransmission timer. Thus, the mobile terminal of this example that may be unable to detect a retransmission on the primary cell that occurs during the subframe immediately following expiration of retransmission period even though the primary cell included UL subframes during the retransmission period.

In addition to issues relating to the manner in which PDCCH subframes are defined, overlapping subframes may create additional challenges. For example, in an instance in which a DL subframe of the primary cell overlaps with a UL subframe of a secondary cell, the mobile terminal may be configured to process the UL subframe of the secondary cell in accordance with the TDD UL/DL subframe configuration of the primary cell, thereby processing the UL subframe of the secondary cell as a DL subframe and leading to unnecessary blind decoding to detect downlink control channels and unnecessarily consuming power of the mobile terminal. Alternatively, in an instance in which the overlapping subframes include a DL subframe in the primary cell and a corresponding UL subframe in the secondary cell, the avoidance of the UL subframe in the secondary cell may also disadvantageously block the DL subframe in the primary cell.

By way of example, reference is now made to FIG. 4 in which the primary and secondary cells have TDD UL/DL subframe configurations #0 and #2, respectively, which, in turn, have overlapped subframes in subframes 3, 4, 8 and 9. As shown, the primary cell has UL subframe and the secondary cell has DL subframe for the overlapping subframes. In this example, the TDD UL/DL subframe configuration of the primary cell is assumed for the secondary cell so as to block overlapping subframes in the secondary cell. As shown in FIG. 4, the DL subframes of the secondary cell that overlapped with UL subframes of the primary cell may be blocked by scheduling restrictions overlapping with the UL subframes of the primary cell. In this regard, the mobile terminal will not monitor the PDCCH or use Cell-specific Common Reference symbols (CRS) for measurements since the mobile terminal will assume that the overlapping subframes of the secondary cell are UL subframes based upon the TDD UL/DL subframe configuration of the primary cell. Thus, the mobile terminal will not receive DL scheduling grants for the secondary cell during the overlapping subframes.

In another example illustrated in FIG. 5, the overlapping subframes may include DL subframes for the primary cell and UL subframes for the secondary cell. In this example, the overlapping UL subframes of the secondary cell may be blocked via DRX overlapping with the corresponding DL subframes of the primary cell. In this example, discontinuous reception may eliminate the need for the mobile terminal to monitor the PDCCH as the mobile terminal may assume that discontinuous reception is configured for the DL subframes based upon the TDD UL/DL subframe configuration of the primary cell. Thus, the overlapping DL subframes in the primary cell may not be utilized.

BRIEF SUMMARY

The methods and apparatus of one example embodiment provide for improvements in conjunction with discontinuous reception via a primary cell and one or more secondary cells that have different TDD UL/DL subframe configurations. In this regard, the methods and apparatus of one embodiment avoid simultaneous transmission and reception by a mobile terminal configured for TDD operation even in instances in which UL subframes of a secondary cell overlap with DL subframes of the primary cell. As such, the method and apparatus of one embodiment may avoid issues associated with the definition of a PDCCH subframe and the DRX parameters that are based upon the PDCCH subframes and may improve the performance of the mobile terminal, even in instances of overlap between subframes of the primary cell and one or more secondary cells.

In one embodiment, a method is provided that defines an active state of a primary cell to be larger than an active state of a secondary cell in a time division duplex (TDD) network that supports carrier aggregation. The method of this embodiment also provides for discontinuous reception via the primary cell and the secondary cell in accordance with different TDD uplink (UL)/downlink (DL) subframe configurations and also in accordance with the respective active states of the primary and secondary cells.

The method of one embodiment may define the active states of the primary and secondary cells by defining different inactivity timers for the primary and secondary cells. For example, the method may define different inactivity timers by defining an inactivity timer for the secondary cell that is smaller than an inactivity timer for the primary cell, such as by setting the inactivity timer for the secondary cell equal to zero. The method of one embodiment may define the active states of the primary and secondary cells by defining an on-duration timer of the primary cell to be equal to an on-duration timer of the secondary cell. In one embodiment, the method may define the active states of the primary and secondary cells by defining the secondary cell to be inactive in an instance in which an UL subframe of the secondary cell overlaps with a DL subframe of the primary cell.

In another embodiment, an apparatus is provided that includes processing circuitry configured to define an active state of a primary cell to be larger than an active state of a secondary cell in a time division duplex (TDD) network that supports carrier aggregation. The processing circuitry of this embodiment is also configured to provide for discontinuous reception via the primary cell and the secondary cell in accordance with different TDD uplink (UL)/downlink (DL) subframe configurations and also in accordance with the respective active states of the primary and secondary cells.

The processing circuitry of one embodiment may be configured to define the active states of the primary and secondary cells by defining different inactivity timers for the primary and secondary cells. For example, the processing circuitry may be configured to define different inactivity timers by defining an inactivity timer for the secondary cell that is smaller than an inactivity timer for the primary cell, such as by setting the inactivity timer for the secondary cell equal to zero. The processing circuitry of one embodiment may be configured to define the active states of the primary and secondary cells by defining an on-duration timer of the primary cell to be equal to an on-duration timer of the secondary cell. In one embodiment, the processing circuitry may be configured to define the active states of the primary and secondary cells by defining the secondary cell to be inactive in an instance in which an UL subframe of the secondary cell overlaps with a DL subframe of the primary cell.

In a further embodiment, a computer program product is provided that includes a computer-readable medium bearing computer program code embodied therein for use with a computer. The computer program code includes code for defining an active state of a primary cell to be larger than an active state of a secondary cell in a time division duplex (TDD) network that supports carrier aggregation. The computer program code of this embodiment also includes code for providing for discontinuous reception via the primary cell and the secondary cell in accordance with different TDD uplink (UL)/downlink (DL) subframe configurations and also in accordance with the respective active states of the primary and secondary cells.

The code for defining the active states of the primary and secondary cells may include code for defining different inactivity timers for the primary and secondary cells. For example, the code for defining different inactivity timers may include code for defining an inactivity timer for the secondary cell that is smaller than an inactivity timer for the primary cell, such as by setting the inactivity timer for the secondary cell equal to zero. The code for defining the active states of the primary and secondary cells may include code for defining an on-duration of the primary cell to be equal to an on-duration of the secondary cell. In one embodiment, the code for defining the active states of the primary and secondary cells may include code for defining the secondary cell to be inactive in an instance in which an UL subframe of the secondary cell overlaps with a DL subframe of the primary cell.

In yet another embodiment, an apparatus is provided that includes means for defining an active state of a primary cell to be larger than an active state of a secondary cell in a time division duplex (TDD) network that supports carrier aggregation. The apparatus of this embodiment also include means for providing for discontinuous reception via the primary cell and the secondary cell in accordance with different TDD uplink (UL)/downlink (DL) subframe configurations and also in accordance with the respective active states of the primary and secondary cells.

The apparatus of one embodiment may include means for defining the active states of the primary and secondary cells by defining different inactivity timers for the primary and secondary cells. For example, the apparatus may include means for defining different inactivity timers by defining an inactivity timer for the secondary cell that is smaller than an inactivity timer for the primary cell, such as by setting the inactivity timer for the secondary cell equal to zero. The apparatus of one embodiment may include means for defining the active states of the primary and secondary cells by defining an on-duration timer of the primary cell to be equal to an on-duration timer of the secondary cell. In one embodiment, the apparatus may include means for defining the active states of the primary and secondary cells by defining the secondary cell to be inactive in an instance in which an UL subframe of the secondary cell overlaps with a DL subframe of the primary cell.

In one embodiment, a method is provided that defines a common on-duration timer and a common inactivity timer for a primary cell and a secondary cell in a time division duplex (TDD) network that supports carrier aggregation. The method of this embodiment also receives signaling from the network identifying one or more subframes of the TDD uplink (UL)/downlink (DL) subframe configuration of the secondary cell to be physical downlink control channel (PDCCH) subframes. The method of this embodiment also provides for discontinuous reception via the primary cell and the secondary cell with the secondary cell being inactive for one or more subframes that are not identified to be PDCCH subframes regardless of the TDD UL/DL subframe configuration for the respective subframes.

The method of one embodiment defines the common on-duration timer and the common inactivity timer by defining common discontinuous reception parameters for the primary and secondary cells. The method may provide for discontinuous reception by providing for discontinuous reception via the secondary cell in accordance with the TDD UL/DL subframe configuration of the primary cell for the subframes identified to be PDCCH subframes. In one embodiment, the PDCCH subframes are the one or more subframes that are designated as DL or special subframes in the TDD UL/DL subframe configuration for each of the primary and secondary cells. The method of one embodiment may receive signaling by receiving signaling that identifies a DL subframe of the secondary cell to be a PDCCH subframe in an instance in which the DL subframe of the secondary cell overlaps with an UL subframe of the primary cell.

In another embodiment, an apparatus is provided that includes processing circuitry configured to define a common on-duration timer and a common inactivity timer for a primary cell and a secondary cell in a time division duplex (TDD) network that supports carrier aggregation. The processing circuitry of this embodiment is also configured to receive signaling from the network identifying one or more subframes of the TDD uplink (UL)/downlink (DL) subframe configuration of the secondary cell to be physical downlink control channel (PDCCH) subframes. The processing circuitry of this embodiment is also configured to provide for discontinuous reception via the primary cell and the secondary cell with the secondary cell being inactive for one or more subframes that are not identified to be PDCCH subframes regardless of the TDD UL/DL subframe configuration for the respective subframes.

The processing circuitry of one embodiment is configured to define the common on-duration timer and the common inactivity timer by defining common discontinuous reception parameters for the primary and secondary cells. The processing circuitry may be configured to provide for discontinuous reception by providing for discontinuous reception via the secondary cell in accordance with the TDD UL/DL subframe configuration of the primary cell for the subframes identified to be PDCCH subframes. In one embodiment, the PDCCH subframes are the one or more subframes that are designated as DL or special subframes in the TDD UL/DL subframe configuration for each of the primary and secondary cells. The processing circuitry of one embodiment may be configured to receive signaling by receiving signaling that identifies a DL subframe of the secondary cell to be a PDCCH subframe in an instance in which the DL subframe of the secondary cell overlaps with an UL subframe of the primary cell.

In a further embodiment, a computer program product is provided that includes a computer-readable medium bearing computer program code embodied therein for use with a computer. The computer program code includes code for defining a common on-duration timer and a common inactivity timer for a primary cell and a secondary cell in a time division duplex (TDD) network that supports carrier aggregation. The computer program code of this embodiment also includes code for receiving signaling from the network identifying one or more subframes of the TDD uplink (UL)/ downlink (DL) subframe configuration of the secondary cell to be physical downlink control channel (PDCCH) subframes. The computer program code of this embodiment also includes code for providing for discontinuous reception via the primary cell and the secondary cell with the secondary cell being inactive for one or more subframes that are not identified to be PDCCH subframes regardless of the TDD UL/DL subframe configuration for the respective subframes.

The code for defining the common on-duration timer and the common inactivity timer may include code for defining common discontinuous reception parameters for the primary and secondary cells. The code for providing for discontinuous reception may include code for providing for discontinuous reception via the secondary cell in accordance with the TDD UL/DL subframe configuration of the primary cell for the subframes identified to be PDCCH subframes. In one embodiment, the PDCCH subframes are the one or more subframes that are designated as DL or special subframes in the TDD UL/DL subframe configuration for each of the primary and secondary cells. The code for receiving signaling may include code for receiving signaling that identifies a DL subframe of the secondary cell to be a PDCCH subframe in an instance in which the DL subframe of the secondary cell overlaps with an UL subframe of the primary cell.

In yet another embodiment, an apparatus is provided that includes means for defining a common on-duration timer and a common inactivity timer for a primary cell and a secondary cell in a time division duplex (TDD) network that supports carrier aggregation. The apparatus of this embodiment also includes means for receiving signaling from the network identifying one or more subframes of the TDD uplink (UL)/ downlink (DL) subframe configuration of the secondary cell to be physical downlink control channel (PDCCH) subframes. The apparatus of this embodiment may also include means for providing for discontinuous reception via the primary cell and the secondary cell with the secondary cell being inactive for one or more subframes that are not identified to be PDCCH subframes regardless of the TDD UL/DL subframe configuration for the respective subframes.

The apparatus of one embodiment includes means for defining the common on-duration timer and the common inactivity timer by defining common discontinuous reception parameters for the primary and secondary cells. The apparatus may include means for providing for discontinuous reception by providing for discontinuous reception via the secondary cell in accordance with the TDD UL/DL subframe configuration of the primary cell for the subframes identified to be PDCCH subframes. In one embodiment, the PDCCH subframes are the one or more subframes that are designated as DL or special subframes in the TDD UL/DL subframe configuration for each of the primary and secondary cells. The apparatus of one embodiment may include means for receiving signaling by receiving signaling that identifies a DL subframe of the secondary cell to be a PDCCH subframe in an instance in which the DL subframe of the secondary cell overlaps with an UL subframe of the primary cell.

In one embodiment, a method is provided that includes defining a common on-duration timer and a common inactivity timer for a primary cell and a secondary cell in a time division duplex (TDD) network that supports carrier aggregation. The method of this embodiment also receives signaling from the network identifying a TDD uplink (UL)/downlink (DL) subframe configuration of the secondary cell. Further, the method of this embodiment provides for discontinuous reception via the primary cell and the secondary cell with the secondary cell being inactive in an instance in which a subframe of the secondary cell is designated by the signaling from the network to be an UL subframe and a corresponding subframe of the primary cell is a DL subframe.

The method of one embodiment defines the common on-duration timer and the common inactivity timer by defining common discontinuous reception parameters for the primary and secondary cells. In one embodiment, the method provides for discontinuous reception by providing for discontinuous reception with the secondary cell being inactive in an instance in which a subframe of the secondary cell is designated by the signaling from the network to be an UL subframe and a corresponding subframe of the primary cell is a DL subframe regardless of the on-duration timer and inactivity timer of the secondary cell.

In another embodiment, an apparatus is provided that includes processing circuitry configured to define a common on-duration timer and a common inactivity timer for a primary cell and a secondary cell in a time division duplex (TDD) network that supports carrier aggregation. The processing circuitry of this embodiment is also configured to receive signaling from the network identifying a TDD uplink (UL)/downlink (DL) subframe configuration of the secondary cell. Further, the processing circuitry of this embodiment is configured to provide for discontinuous reception via the primary cell and the secondary cell with the secondary cell being inactive in an instance in which a subframe of the secondary cell is designated by the signaling from the network to be an UL subframe and a corresponding subframe of the primary cell is a DL subframe.

The processing circuitry of one embodiment is configured to define the common on-duration timer and the common inactivity timer by defining common discontinuous reception parameters for the primary and secondary cells. In one embodiment, the processing circuitry is configured to provide for discontinuous reception by providing for discontinuous reception with the secondary cell being inactive in an instance in which a subframe of the secondary cell is designated by the signaling from the network to be an UL subframe and a corresponding subframe of the primary cell is a DL subframe regardless of the on-duration timer and inactivity timer of the secondary cell.

In a further embodiment, a computer program product is provided that includes a computer-readable medium bearing computer program code embodied therein for use with a computer. The computer program code includes code for defining a common on-duration timer and a common inactivity timer for a primary cell and a secondary cell in a time division duplex (TDD) network that supports carrier aggregation. The computer program code also includes code for receiving signaling from the network identifying a TDD uplink (UL)/downlink (DL) subframe configuration of the secondary cell. Further, the computer program code also includes code for providing for discontinuous reception via the primary cell and the secondary cell with the secondary cell being inactive in an instance in which a subframe of the secondary cell is designated by the signaling from the network to be an UL subframe and a corresponding subframe of the primary cell is a DL subframe.

The code for defining the common on-duration timer and the common inactivity timer may include code for defining common discontinuous reception parameters for the primary and secondary cells. In one embodiment, the code for providing for discontinuous reception includes code for providing for discontinuous reception with the secondary cell being inactive in an instance in which a subframe of the secondary cell is designated by the signaling from the network to be an UL subframe and a corresponding subframe of the primary cell is a DL subframe regardless of the on-duration timer and inactivity timer of the secondary cell.

In yet another embodiment, an apparatus is provided that includes means for defining a common on-duration timer and a common inactivity timer for a primary cell and a secondary cell in a time division duplex (TDD) network that supports carrier aggregation. The apparatus of one embodiment also means for receiving signaling from the network identifying a TDD uplink (UL)/downlink (DL) subframe configuration of the secondary cell. Further, the apparatus of this embodiment includes means for providing for discontinuous reception via the primary cell and the secondary cell with the secondary cell being inactive in an instance in which a subframe of the secondary cell is designated by the signaling from the network to be an UL subframe and a corresponding subframe of the primary cell is a DL subframe.

The apparatus of one embodiment includes means for defining the common on-duration timer and the common inactivity timer by defining common discontinuous reception parameters for the primary and secondary cells. In one embodiment, the apparatus includes means for providing for discontinuous reception by providing for discontinuous reception with the secondary cell being inactive in an instance in which a subframe of the secondary cell is designated by the signaling from the network to be an UL subframe and a corresponding subframe of the primary cell is a DL subframe regardless of the on-duration timer and inactivity timer of the secondary cell.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Figure 1:
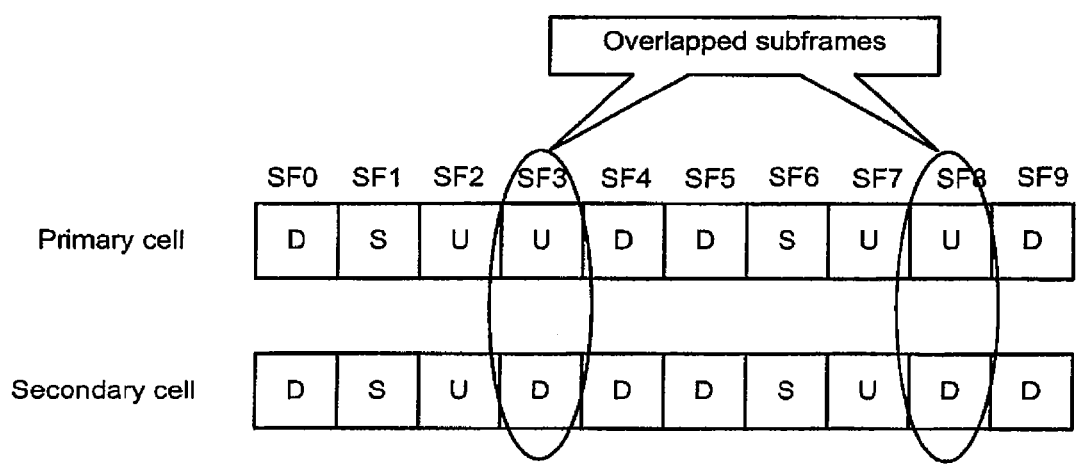
Figure 2:
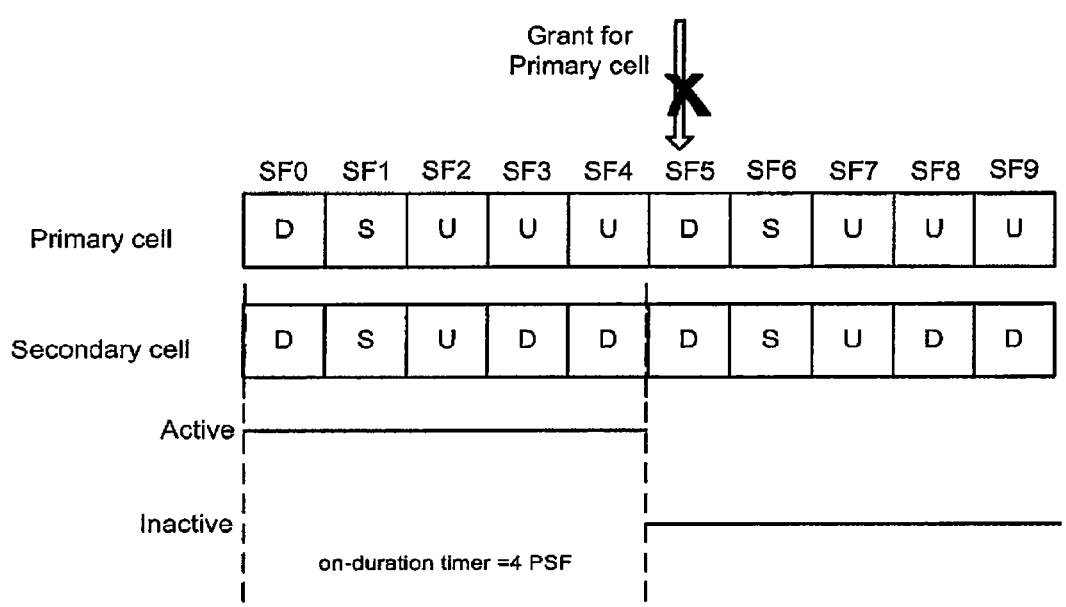
Figure 3:
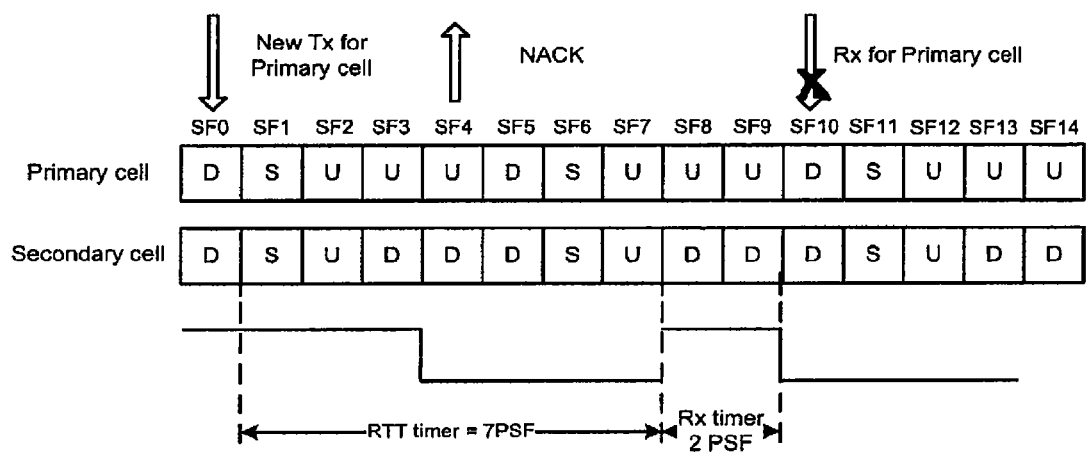
Figure 4:
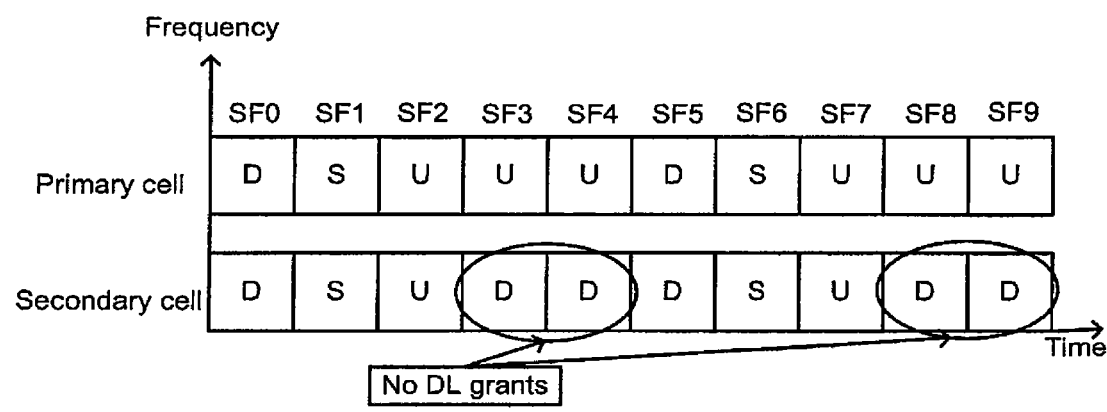
Figure 5:
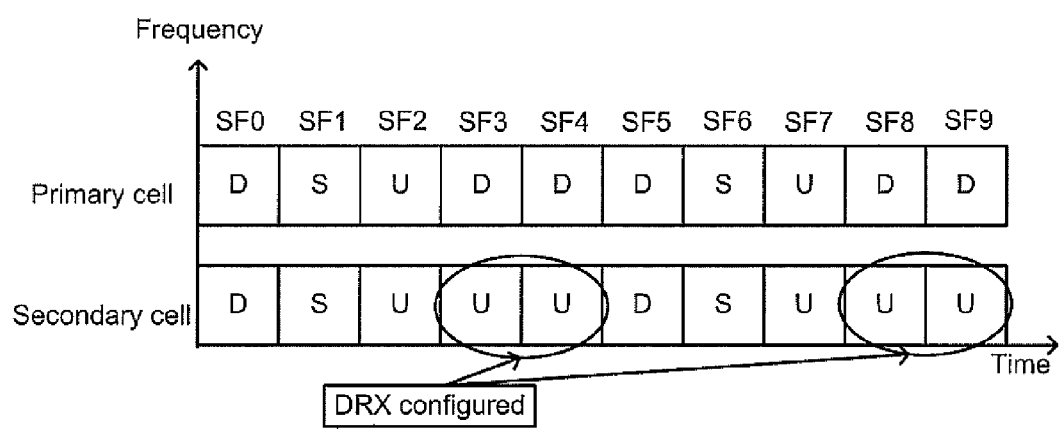
Figure 6:
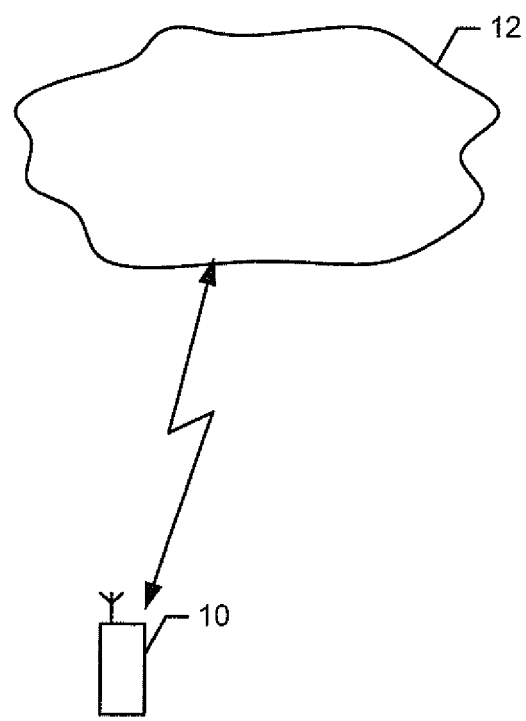
Figure 7:
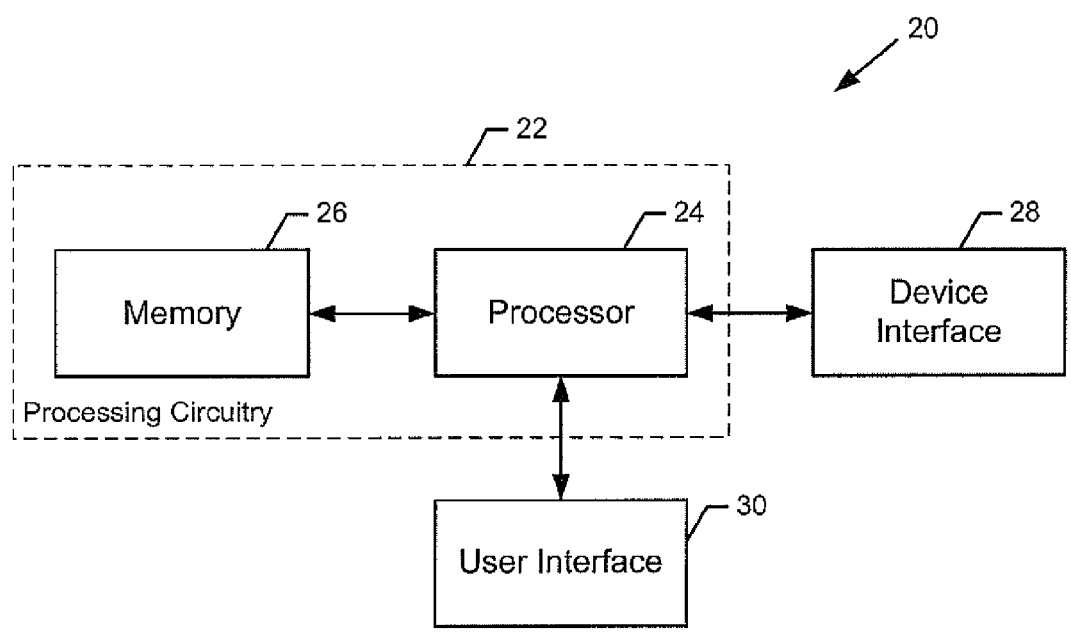
Figure 8:
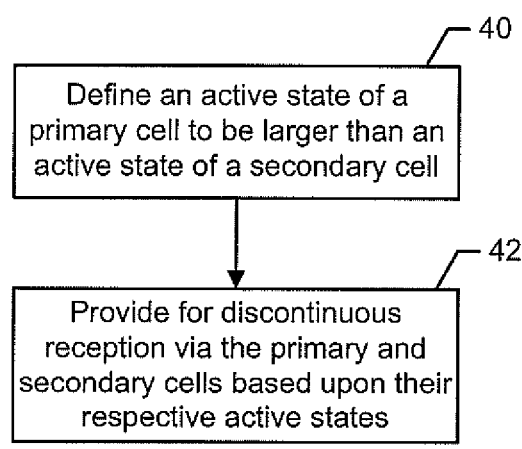
Figure 9:
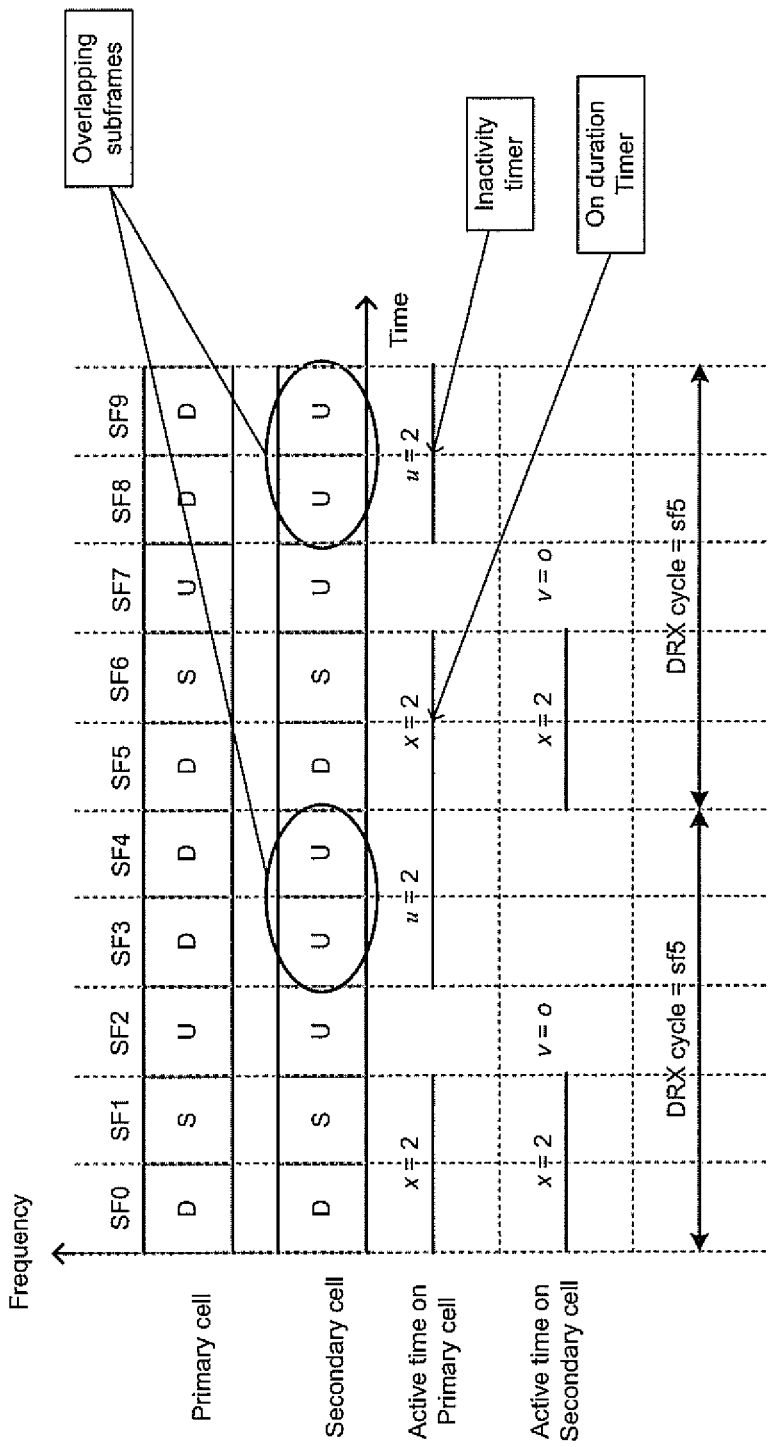
Figure 10:
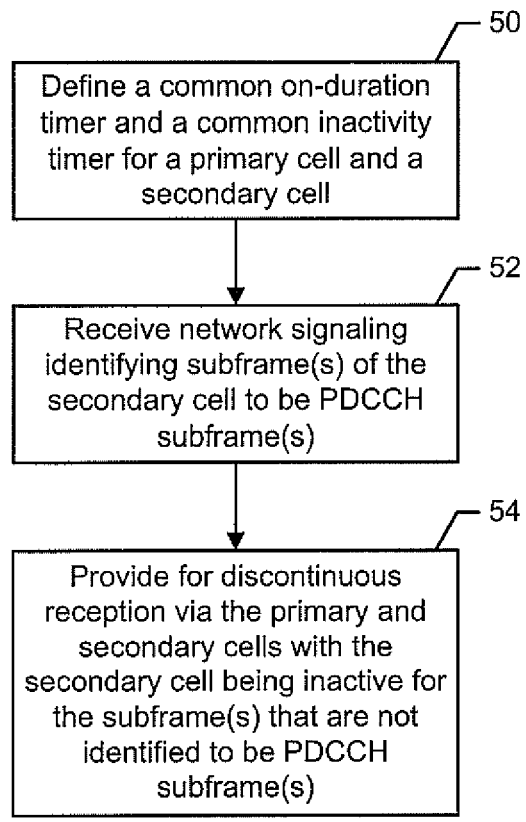
Figure 11:
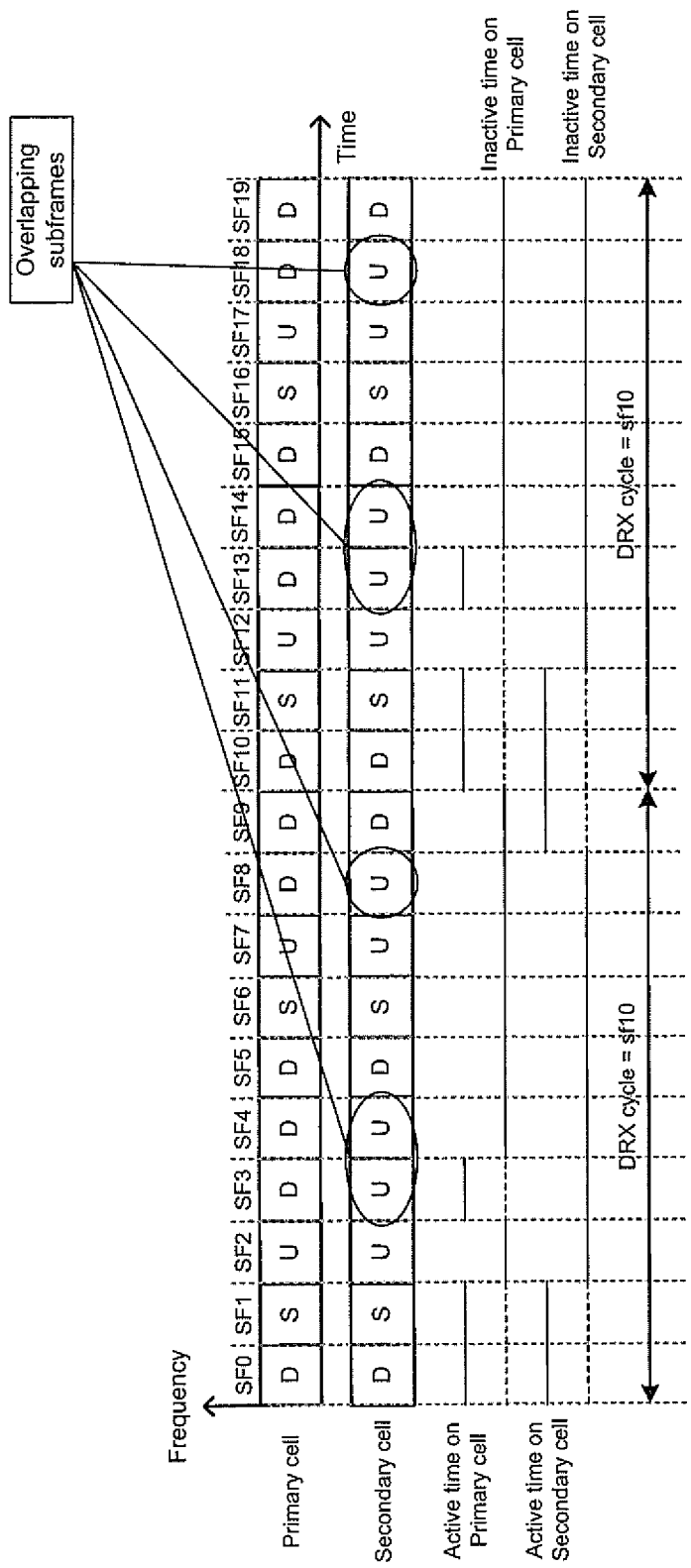
Figure 12:
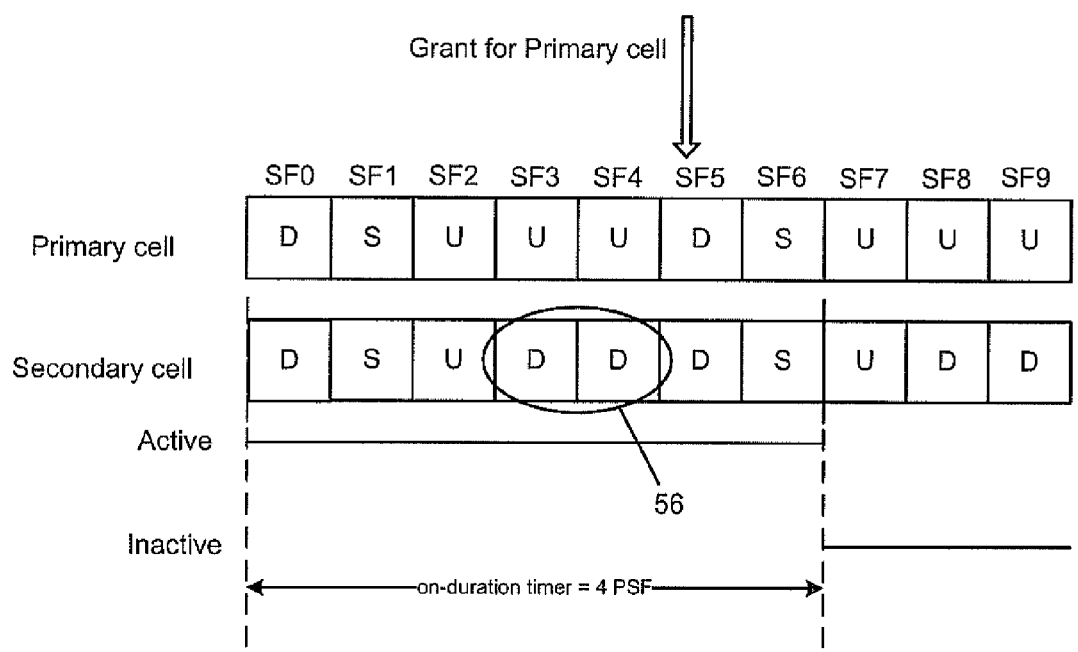
Figure 13:
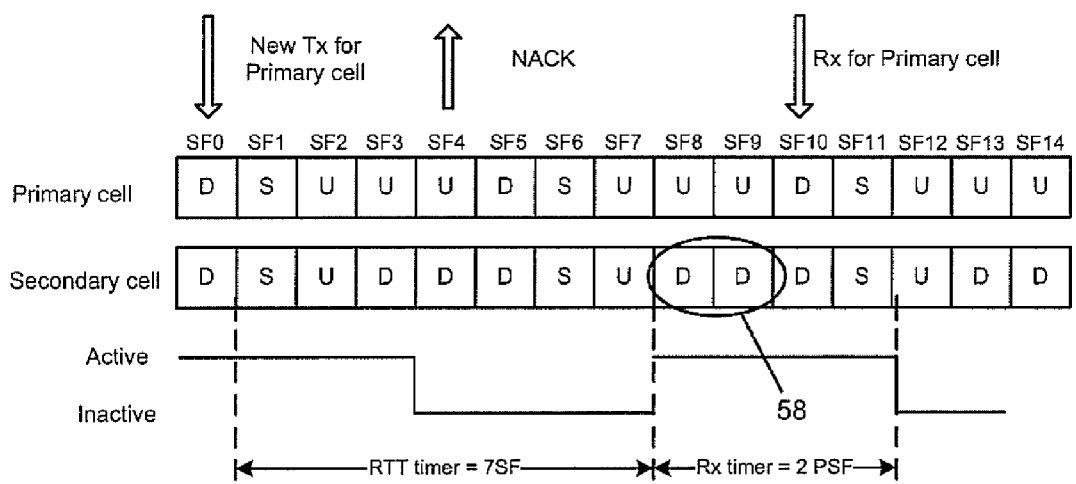
Figure 14:
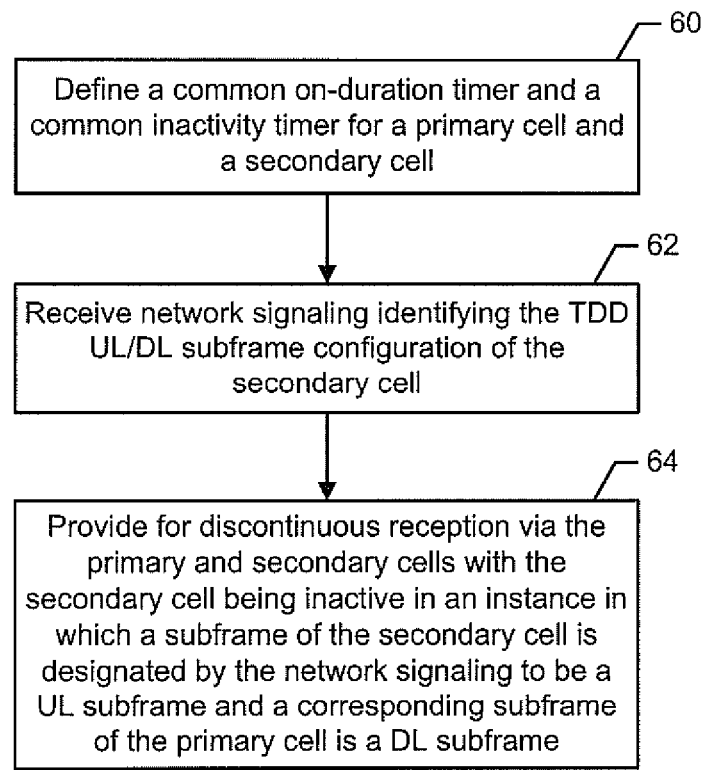
Figure 15:
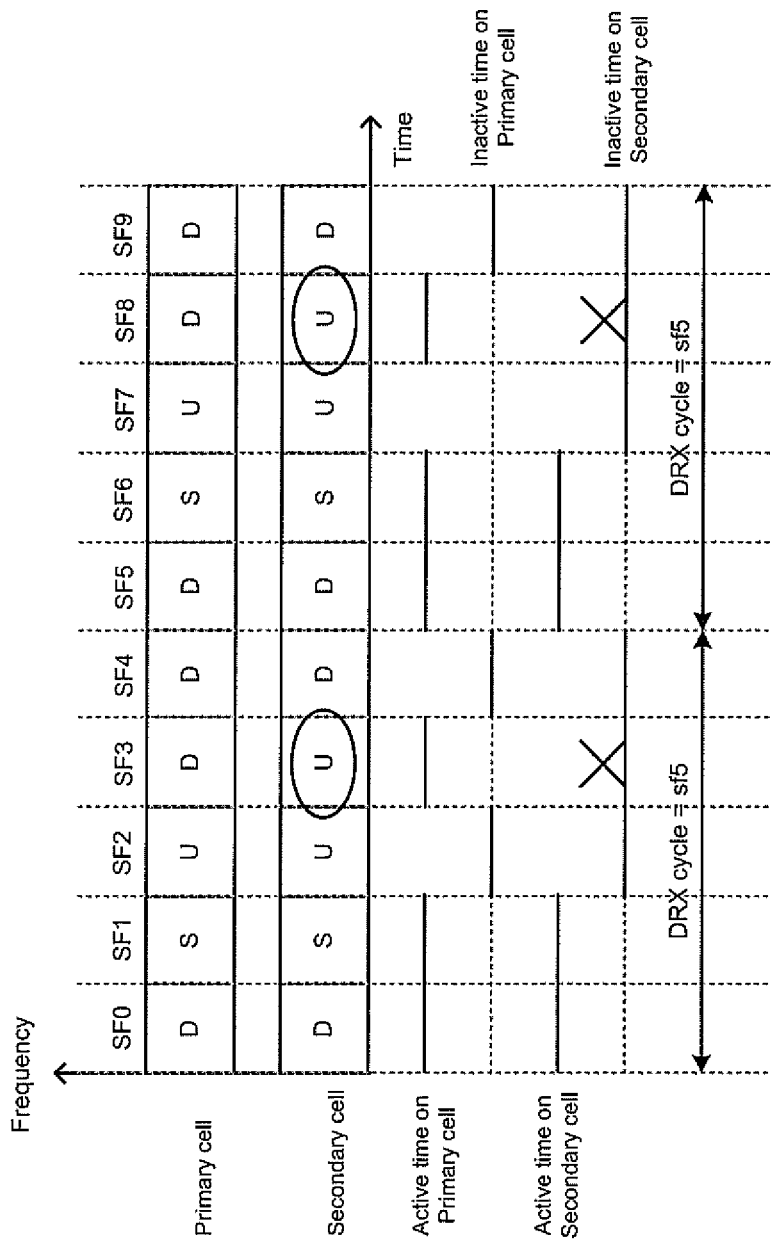

Having thus described example embodiments the invention in general terms, reference will now be made to the accompanying drawings, which are not necessarily drawn to scale, and wherein:

FIG. 1 illustrates the TDD UL/DL subframe configurations of a primary cell and a secondary cell in which subframe #3 is overlapping;

FIG. 2 illustrates the TDD UL/DL subframe configurations of a primary cell and a secondary cell in which a grant for the primary cell arrives after the expiration of the on-duration time;

FIG. 3 illustrates the TDD UL/DL subframe configurations of a primary cell and a secondary cell in which a retransmission on the primary cell is not detected as a result of the expiration of the retransmission timer;

FIG. 4 illustrates the TDD UL/DL subframe configurations of a primary cell and a secondary cell in an instance in which the overlapping subframes of the secondary cell are DL subframes;

FIG. 5 illustrates the TDD UL/DL subframe configurations of a primary cell and a secondary cell in an instance in which the overlapping subframes of the secondary cell are UL subframes;

FIG. 6 illustrates a system including a mobile terminal configured to support TDD signaling and carrier aggregation in accordance with one embodiment to the present invention;

FIG. 7 is a block diagram of a mobile terminal in accordance with one embodiment of the present invention;

FIG. 8 is a flowchart illustrating operations performed in accordance with one embodiment of the present invention;

FIG. 9 illustrates the TDD UL/DL subframe configurations of a primary cell and a secondary cell in an instance in which the overlapping UL subframe of the secondary cell is blocked by the definition of different DRX parameters for the primary and secondary cells in accordance with one embodiment of the present invention;

FIG. 10 is a flowchart illustrating operations performed in accordance with another embodiment of the present invention;

FIG. 11 illustrates the TDD UL/DL subframe configurations of a primary cell and a secondary cell in an instance in which the overlapping UL subframe of the secondary cell is blocked by the redefinition of selected subframes of the secondary cell as PDCCH cells in accordance with another embodiment of the present invention;

FIG. 12 illustrates the TDD UL/DL subframe configurations of a primary cell and a secondary cell in an instance in which overlapping DL subframes of the secondary cell are monitored while the on-duration timer is active in accordance with another embodiment of the present invention;

FIG. 13 illustrates the TDD UL/DL subframe configurations of a primary cell and a secondary cell in an instance in which overlapping DL subframes of the secondary cell are monitored while the retransmission timer is active in accordance with another embodiment of the present invention;

FIG. 14 is a flowchart illustrating operations performed in accordance with yet another embodiment to the present invention; and FIG. 15 illustrates the TDD UL/DL subframe configurations of a primary cell and a secondary cell in an instance in which the overlapping UL subframe of the secondary cell is blocked based upon information provided via network signaling regarding the TDD UL/DL subframe configuration of the secondary cell in accordance with yet another embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are disclosed for providing for discontinuous reception via a primary cell and one or more secondary cells that have different TDD UL/DL subframe configurations. In this regard, the method, apparatus and computer program product of some example embodiments may respond to overlapped subframes in such a manner as to avoid simultaneous transmission and reception by a TDD UE and to overcome other issues including those relating to the definition of the PDCCH subframes. Although the method, apparatus and computer program product may be implemented in a variety of different systems, one example of such a system is shown in FIG. 6, which includes a first communication device (e.g., mobile terminal 10) that is capable of communication with a network 12 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 12 may include a collection of various different nodes, devices or functions that may be in communication with each other via corresponding wired and/or wireless interfaces. For example, the network may include one or more base stations, such as one or more node Bs, evolved node Bs (eNBs), access points or the like, each of which may serve a coverage area divided into one or more cells. The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network. In accordance with embodiments of the present invention, the network may be a TDD network.

A communication device, such as the mobile terminal 10 (also known as user equipment (UE)), may be in communication with other communication devices or other devices via the network 12. In instances in which the network is a TDD network, the mobile terminal may be configured to support communications in accordance with TDD. In some cases, the communication device may include an antenna for transmitting signals to and for receiving signals from a base station via a plurality of CCs including a primary cell (Pcell) and one or more secondary cells (Scell). As described below, each of the primary and secondary cells may have a TDD UL//DL subframe configuration that defines a predefined sequence of DL subframes, UL subframes and special subframes to be exchanged between the mobile terminal and the network. The TDD UL/DL subframe configurations of the primary and secondary cells may be different such that there may be one or more overlapping subframes. As such, the mobile terminal of one embodiment may configure the discontinuous reception so as to appropriately respond to the overlapped subframes of the primary and secondary cells.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 12.

In one embodiment, for example, the mobile terminal 10 may be embodied as or otherwise include an apparatus 20 as generically represented by the block diagram of FIG. 7. In the context of a mobile terminal, the apparatus may be configured to provide for discontinuous reception in a manner that appropriately responds to overlapped subframes of the primary and secondary cells. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 7, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIGS. 8, 10 and 14, flowcharts illustrating the operations performed by a method, apparatus and computer program product, such as apparatus 20 of FIG. 7, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 8, 10 and 14, when executed, convert a computer or processing circuitry into a particular machine configured to perform an example embodiment of the present invention. Accordingly, the operations of each of FIGS. 8, 10 and 14 define an algorithm for configuring a computer or processing circuitry, e.g., processor 24, to perform an example embodiment. In some cases, a general purpose computer may be provided with an instance of the processor which performs the algorithm of a respective one of FIGS. 8, 10 and 14 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

As shown in FIGS. 8 and 9, methods and apparatus of example embodiments of the present invention provide mechanisms for use in discontinuous reception via different TDD UL/DL subframe configurations of the primary and secondary cells so as to avoid simultaneous transmission and reception that might otherwise be occasioned by overlapping subframes, such as in an instance in which a UL subframe of a secondary cell overlaps with a DL subframe of a primary cell. In one embodiment, an overlapping UL subframe of a secondary cell is blocked by appropriate configuration of the DRX parameters. In particular, a subset of the DRX parameters are defined to be common for both the primary and secondary cells, while another subset of the DRX parameters are defined to be unique to the respective primary and secondary cells. In this regard, the set of DRX parameters that are common or identical for the primary and secondary cells may include the DRX cycle, the on-duration timer, the DRX short cycle and the DRX short cycle timer. The DRX cycle specifies the periodic repetition in subframes of an active state that lasts for the on-duration followed by an inactive period. The on-duration timer specifies the number of PDCCH subframes that the mobile terminal should process in the active state when a new DRX cycle begins. The DRX short cycle specifies the periodic repetition in subframes of an active state of a mobile terminal 10 that is operating in accordance with a short DRX condition. In addition, the DRX short cycle timer specifies the consecutive number of short DRX cycles after the DRX inactivity timer has expired. In this embodiment, the set of DRX parameters that are specific and unique to individual ones of the primary and secondary cells include the DRX inactivity timer and, in one embodiment, the DRX re-transmission timer. The DRX inactivity timer specifies the number of PDCCH subframes after successfully decoding a PDCCH for which the mobile terminal must remain active. The DRX re-transmission timer specifies the maximum number of consecutive PDCCH subframes for which the mobile terminal should remain active to wait for an incoming transmission after the first available re-transmission time.

In accordance with this embodiment, the DRX cycle may be set equal to a predefined number of subframes (sf) designated sfy based upon the DL to UL switch point periodicity of the primary cell. In addition, the on-duration timer may be set equal to a predefined number of PDCCH subframes designated sfx in which x is less than or equal to y. In this context, it is noted that the PDCCH subframes are those subframes that are either DL subframes or special subframes, but not UL subframes.

Additionally, the DRX parameters that are specific are unique to individual ones of the primary and secondary cells may be set to values that configure artificially different active states for the mobile terminal 10 that is transmitting and receiving via the primary cell and the secondary cell. In this regard, the apparatus 20 may include a means, such as the processing circuitry 22, the processor 24 or the like, for defining an active state of the primary cell to be larger than the active state of the secondary cell in a TDD network 12 that supports carrier aggregation. See block 40 of FIG. 8. By defining the active state of the primary cell to be larger than the active state of the secondary cell, overlapping UL subframes of the secondary cell may be blocked. Indeed, the apparatus may include means, such as the processing circuitry, the processor, the device interface 28 or the like, for providing for discontinuous reception via the primary and secondary cells in accordance with different TDD UL/DL subframe configurations and also in accordance with the respective active states of the primary and secondary cells. See block 42 of FIG. 8. In order to define the active state of the primary cell to be larger than the active state of the secondary cell, the apparatus may include means, such as a processing circuitry, the processor or the like, for defining different inactivity timers for the primary and secondary cells. In one embodiment, the inactivity timer of the secondary cell may be smaller than the inactivity of the primary cell, such as by setting the inactivity timer to zero. Although different inactivity timers may be defined for the primary and secondary cells in order to define an active state of the primary cell to be larger than the active state of the secondary cell, the apparatus may include means, such as the processing circuitry, the processor or the like, for defining an on-duration timer of the primary cell to be equal to the on-duration timer of the secondary cell. By defining the active state of the primary cell to be larger than the active state of the secondary cell, the secondary cell may be inactive in an instance in which the DL subframe of the secondary cell overlaps with a UL subframe of the primary cell, as illustrated by the example of FIG. 9.

In this regard, the primary cell and the secondary cell of FIG. 9 have different TDD UL/DL subframe configurations with the primary cell having TDD UL/DL configuration #2 and the secondary cell having TDD UL/DL configuration #0. As described below, FIG. 9 illustrates the manner in which an overlapping UL subframe of the secondary cell is blocked as a result of the selection of different inactivity timers for the primary cell and the secondary cell. In this regard, the DRX cycle and the on-duration timer are set to 5 subframes, e.g., sf5, and 2 PDCCH subframes, e.g., x=2, respectively, for both the primary and secondary cells. As such, these DRX parameters are common for both the primary and secondary cells. However, the inactivity timer is set to different values for the primary and secondary cells with the inactivity timer of the primary cell being said equal to 2 PDCCH subframes, e.g., u=2, and the inactivity timer of the secondary cell being said equal to 0, e.g., v=0. As shown in FIG. 9, subframes 3, 4, 8 and 9 overlap with subframes 3, 4, 8 and 9 of the primary cell being DL subframes and then the corresponding subframes of the secondary cell being UL subframes. By setting the inactivity timer of the primary cell to 2 PDCCH subframes and the inactivity timer of the secondary cell to be 0 PDCCH subframes, the overlapping subframes of the primary cell, that is, subframes 3, 4, 8 and 9 are monitored by the mobile terminal 10 in order to receive DL signals via the primary cell since these overlapping subframes of the primary cell are within the period of time defined by the inactivity timer of the primary cell. Since the inactivity timer of the secondary cell is set equal to 0, however, the overlapping subframes of the secondary cell, that is, UL subframes 3, 4, 8 and 9 are not received as the mobile terminal does not monitor the secondary cell during this period of time.

In another embodiment illustrated in FIGS. 10 and 11, the PDCCH subframes of the secondary cell may be redefined in such a manner as to block a UL subframe of the secondary cell that overlaps with the DL subframe of the primary cell by failing to indicate that the overlapping UL subframe of the secondary cell is a PDCCH subframe. As shown in block 50 of FIG. 10, the apparatus 20 of this embodiment may include means, such as the processing circuitry 22, the processor 22 or the like, for defining the DRX parameters to be the same for both the primary cell and the secondary cell. As such, a common on-duration timer may be defined for the primary and the secondary cells and a common inactivity timer may be defined for the primary cell and the secondary cell. In addition, the other DRX parameters may also be defined to be identical for both the primary and secondary cells including, for example, the DRX cycle, the DRX short cycle, the DRX short cycle timer and the DRX re-transmission timer. As also shown in block 52 of FIG. 10, the apparatus may include means, such as the processing circuitry, the processor or the like, for receiving signaling from the network 12, such as from a base station, e.g., an eNB, identifying one or more subframes of the TDD UL/DL subframe configuration of the secondary cell to be PDCCH subframes. In one embodiment, one or more subframes of the secondary cell may be identified to be PDCCH subframes by specifically identifying the subframe(s) that are to be considered PDCCH subframes with all other subframes of the secondary cell being considered not to be PDCCH subframes. Alternatively, the one or more subframes of the secondary cell may be identified to be PDCCH subframes by specifically identifying the subframe(s) of the secondary cell that are not PDCCH subframes such that all other subframes of the secondary cell are PDCCH subframes. In contrast to a conventional definition of a PDCCH subframe as being either a DL subframe or a special subframe, but not a UL subframe, the signaling that is received from the network may define the subframes of the secondary cell to be PDCCH subframes regardless of the type of subframe, that is, regardless of whether the respective subframe in the primary cell is a DL subframe, and UL subframe, or a special subframe.

As also shown in block 54 of FIG. 10, the apparatus 20 may include means, such as a processing circuitry 22, the processor 24, the device interface 28 or the like, for providing discontinuous reception via the primary cell and secondary cell with the secondary cell being inactive for one or more subframes that are not identified to be PDCCH subframes regardless of the TDD UL/DL subframe configuration for the respective subframes. Thus, for those subframes of the secondary cell that are not identified to be PDCCH subframes as a result of the network signaling, the subframes will be inactive regardless of whether the respective subframes in the primary cell are UL subframes, DL subframes or special subframes and also regardless of the status of the on-duration timer, the inactivity timer, the re-transmission timer or the like of the secondary cell. In providing for the discontinuous reception, the apparatus may also include means, such as the processing circuitry, the processor, the device interface or the like, for providing for discontinuous reception via the secondary cell in accordance with the TDD UL/DL subframe configuration of the primary cell for the subframes identified to be PDCCH subframes. Thus, in an instance in which the network signaling indicates that one or more subframes of the secondary cell are PDCCH subframes, the apparatus, such as the processing circuitry, the processor, the device interface or the like, may provide for the discontinuous reception via the secondary cell in accordance with the TDD UL/DL subframe configuration of the primary cell for the subframes identified to be PDCCH subframes. In other words, for those subframes identified by the network signaling to be PDCCH subframes, the apparatus, such as the processing circuitry, the processor, the device interface or the like, may define the subframes of the secondary cell to be DL subframes, UL subframes or special subframes in the same manner as defined by the TDD UL/DL subframe configuration of the primary cell and regardless of the actual type of the subframes, e.g., UL subframes, DL subframes or special subframes, as defined by the TDD UL/DL subframe configuration of the secondary cell. Thus, a UL subframe of the secondary cell that overlaps with the DL subframe of the primary cell may be blocked by the network signaling indicating that the UL subframe of the secondary cell is not a PDCCH subframe such that the overlapping UL subframe of the secondary cell is inactive.

By way of example, reference is now made to FIG. 11 in which the primary cell and the secondary cell have different TDD UL/DL subframe configurations, namely, TDD UL/DL subframe configurations #2 and #6 for the primary and secondary cells, respectively. In this example, the on-duration timer and the inactivity timer have been defined to be the same or in common for both the primary and secondary cells. In particular, the on-duration timer is set to equal 1 PDCCH subframe and the inactivity timer is set to equal 2 PDCCH subframes. Additionally, the hybrid automatic repeat request (HARQ) re-transmission timer for the secondary cell is said equal to 3 PDCCH subframes and the DRX cycle is also set equal to 10 subframes for both the primary and secondary cells.

In one embodiment as shown in FIG. 11, the network 12 may have signaled that subframes #0, #1, #3, #4, #5, #6, #8 and #9 are PDCCH subframes for the primary cell and that subframes #0, #1, #5, #6 and #9 are PDCCH subframes of the secondary cell. As shown in FIG. 11, the active time for primary cell includes subframes #0, #1 and #3 with the active time for subframe #0 being attributable to the on-duration timer of 1 PDCCH subframe and the active time for subframes #1 and 3 being attributable to the inactivity timer having 2 PDCCH subframes. With respect to the secondary cell, the active time includes subframes #0 and 1 with the subframe #0 being active as a result of the on-duration timer and its value of 1 PDCCH subframe and subframe #1 being active as a result of the inactivity timer. Even though the inactivity timer is said equal to 2 PDCCH subframes, the next subframe that otherwise would have been considered a PDCCH subframe, that is, subframe #3, is not identified as a PDCCH subframe via the network signaling. As such, the secondary cell remains inactive for subframe #3 regardless of the type of the subframe, such as an UL subframe in this instance, and the inactivity timer expires. Thus, the method and apparatus of this embodiment resolves any issues with overlapping subframe #3 by defining the PDCCH subframes of the secondary cell such that the secondary cell is inactive for the overlapping subframe. The embodiment of FIG. 11 also illustrates the impact of the HARQ re-transmission timer for the secondary cell. In this regard, the Hybrid Automatic Request Round Trip Time (HARQ RTT) may equal 7 subframes such that the first available re-transmission time following the first transmission in subframes #0 and #1 and the 7 subframes of the HARQ RTT is in subframe #9. Thus, subframe #9 of the secondary cell in the first DRX cycle is also active due to the HARQ re-transmission timer for the secondary cell. In this example, the HARQ re-transmission timer for the secondary cell may be 3 PDCCH subframes to avoid the need for the mobile terminal 10 to wake up too early since the first re-transmission may happen at the earliest at subframe #9 due to the HARQ RTT delay. It is also noted that the primary cell may have a HARQ re-transmission timer that may be different than the HARQ re-transmission timer of the secondary cell.

By way of further example, reference is now made to FIGS. 12 and 13. In these embodiments, the secondary cell is considered to be active in an instance in which a subframe is overlapping and either the on-duration timer or the inactivity timer has begun, but is not yet expired. With reference to element 56 of FIG. 12, for example, subframes #3 and 4 are overlapping subframes and should be monitored by the mobile terminal 10 in accordance with this embodiment since the on-duration timer has started and has not yet expired. Thus, the secondary cell should remain active for overlapping subframes #3 and 4. Similarly, the method and apparatus for this embodiment may configure the secondary cell to be active for an overlapping subframe for which the HARQ re-transmission timer (shown as the Rx timer in FIG. 13) has started and has not yet expired. For the primary cell and the secondary cell of this embodiment, the on-duration timer is set to 3 PDCCH subframes and the HARQ re-transmission timer is set to 2 PDCCH subframes. In contrast to the embodiment of FIG. 11, the primary and secondary cells of the embodiment of FIG. 13 have a common HARQ re-transmission timer. As shown in FIG. 13, for example, subframes #8 and 9 are overlapping subframes designated 58, but the secondary cell should be active following expiration of the on-duration timer and the HARQ RTT (shown as the RTT timer of 7 subframes in FIG. 13) and should therefore monitor these overlapping subframes since the re-transmission timer has started, but has not yet expired. As such, the method and apparatus of this embodiment also accommodates overlapping subframes.

Referring now to FIGS. 14 and 15, a method and apparatus of another embodiment is illustrated. In this embodiment, the TDD UL/DL subframe configuration of the secondary cell is provided by signaling from the network 12 which may, in turn, direct the discontinuous reception via the secondary cell. As such, the mobile terminal 10 may provide for discontinuous reception in such a manner that the secondary cell is inactive in an instance in which a subframe of the secondary cell is designated by the network signaling to be a UL subframe while the corresponding subframe of the primary cell is a DL subframe. Thus, the overlapping UL subframe of the secondary cell may be blocked so as to avoid simultaneous transmission reception by the mobile terminal.

As shown in block 60 of FIG. 14, the apparatus 20 of this embodiment may include means, such as the processing circuitry 22, the processor 24 or the like, for defining a common on-duration timer and a common inactivity timer for the primary cell and the secondary cell in a TDD network that supports carrier aggregation. In one embodiment, all DRX parameters may be set equal and therefore be common for both the primary cell and the secondary cell. The apparatus of this embodiment may also include means, such as the processing circuitry, the processor, the device interface 28 or the like, for receiving signaling from the network 12 identifying a TDD UL/DL subframe configuration of the secondary cell. See block 62 of FIG. 14. As such, the mobile terminal may be informed based upon the network signaling of the subframes of the secondary cell that are UL subframes, the subframes of the secondary cell that are DL subframes and the subframes of the secondary cell that are special subframes. The apparatus of this embodiment may also include means, such as the processing circuitry, the processor, the device interface or the like, for providing for discontinuous reception via the primary cell and the secondary cell with the secondary cell being inactive in an instance in which subframe of the secondary cell is designated by the network signaling to be a UL subframe and the corresponding subframe of the primary cell is a DL subframe. See block 64 of FIG. 14. In this regard, the secondary cell may be inactive for the overlapping UL subframe regardless of the status of the on-duration timer, the inactivity timer and the re-transmission timer of the secondary cell. Thus, even in an instance in which the on-duration timer, the inactivity timer or the re-transmission timer of the secondary cell has started and has not yet expired, the overlapping UL subframe of the secondary cell may be blocked since the secondary cell will be inactive in accordance with this embodiment.

By way of example of this embodiment, reference is now made to FIG. 15 in which the primary cell and secondary cell have different predefined TDD UL/DL subframe configurations, namely, TDD UL/DL subframe configurations #2 and #1 for the primary cell and the secondary cell, respectively. Additionally, FIG. 15 illustrates the active time and the inactive time for the primary cell and the secondary cell as well as the DRX cycle. Although the DRX parameters including the on-duration timer and the inactivity timer are the same or common for both the primary cell and the secondary cell, the secondary cell is inactive during subframe #3 while the primary cell is active. In this regard, the mobile terminal 10 of this embodiment has received signaling from the network 12 that identifies the TDD UL/DL subframe configuration of the secondary cell. Based upon this information, the mobile terminal, such as the processing circuitry 22, the processor 24 or the like, may identify the overlapping subframes and, in particular, may identify the overlapping subframes having a UL subframe for the secondary cell. As such, the mobile terminal, such as the processing circuitry, the processor or the like, may cause the secondary cell to be inactive for the overlapping UL subframes of the secondary cell even though the DRX parameters, such as the on-duration timer, the inactivity timer, the re-transmission timer or the like, would otherwise cause the secondary cell to be active. As such, the method and apparatus of this embodiment blocks the overlapping UL subframes of the secondary cell and avoid simultaneous transmission and reception by the mobile terminal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, while principally described herein in conjunction with LTE, the method and apparatus of example embodiments may be employed in conjunction with other types of systems. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
defining, with circuitry, an active state of a primary cell to be larger than an active state of a secondary cell in a time division duplex (TDD) network that supports carrier aggregation; and
providing for discontinuous reception via the primary cell and the secondary cell in accordance with the active states of the primary and secondary cells and a first TDD uplink (UL)/downlink (DL) subframe configuration for the primary cell and a second TDD UL/DL subframe configuration for the secondary cell, the first and second TDD UL/DL configurations having a structure in which an UL subframe of the secondary cell overlaps in time with a DL subframe of the primary cell, wherein
defining the active states of the primary and secondary cells comprises defining a first subset of discontinuous reception (DRX) parameters to be common to both the primary and secondary cells and defining a second subset of DRX parameters to be unique to the respective primary and secondary cells.

2. The method of claim 1, wherein
defining the active states of the primary and secondary cells comprises defining different inactivity timers for the primary and secondary cells.

3. The method of claim 2, wherein
defining different inactivity timers comprises defining an inactivity timer for the secondary cell that is smaller than an inactivity timer for the primary cell.

4. The method of claim 3, wherein
defining the inactivity timer for the secondary cell comprises setting the inactivity timer for the secondary cell equal to zero.

5. The method of claim 1, wherein
defining the active states of the primary and secondary cells comprises defining an on-duration timer of the primary cell to be equal to an on-duration timer of the secondary cell.

6. A non-transitory computer-readable medium including computer program code, which when executed by the circuitry, causes the circuitry to perform the method of claim 1.

7. An apparatus comprising:
circuitry configured to:
define an active state of a primary cell to be larger than an active state of a secondary cell in a time division duplex (TDD) network that supports carrier aggregation; and
provide for discontinuous reception via the primary cell and the secondary cell in accordance with the active states of the primary and secondary cells and a first TDD uplink (UL)/downlink (DL) subframe configuration for the primary cell and a second TDD UL/DL subframe configuration for the secondary cell, the first and second TDD UL/DL configurations having a structure in which an UL subframe of the secondary cell overlaps in time with a DL subframe of the primary cell, wherein
the circuitry is configured to define the active states of the primary and secondary cells by defining a first subset of discontinuous reception (DRX) parameters to be common to both the primary and secondary cells and defining a second subset of DRX parameters to be unique to the respective primary and secondary cells.

8. The apparatus of claim 7, wherein
the circuitry is configured to define the active states of the primary and secondary cells by defining different inactivity timers for the primary and secondary cells.

9. The apparatus of claim 8, wherein
the circuitry is configured to define different inactivity timers by defining an inactivity timer for the secondary cell that is smaller than an inactivity timer for the primary cell.

10. The apparatus of claim 9, wherein
the circuitry is configured to define the inactivity timer for the secondary cell by setting the inactivity timer for the secondary cell equal to zero.

11. The apparatus of claim 7, wherein
the circuitry is configured to define the active states of the primary and secondary cells by defining an on-duration timer of the primary cell to be equal to an on-duration timer of the secondary cell.

12. The apparatus of claim 7, wherein
the circuitry is configured to define the active states of the primary and secondary cells by defining the secondary cell to be inactive in an instance in which an UL subframe of the secondary cell overlaps with a DL subframe of the primary cell.

13. An apparatus comprising:
circuitry configured to:
 define an active state of a primary cell to be larger than an active state of a secondary cell in a network that supports carrier aggregation; and
 provide for discontinuous reception via the primary cell and the secondary cell based on the respective active states of the primary and secondary cells in a case that a downlink (DL) subframe of a primary cell overlaps in time with an uplink (UL) subframe of a secondary cell, wherein
 the circuitry is configured to define the active states of the primary and secondary cells by defining a first subset of discontinuous reception (DRX) parameters to be common to both the primary and secondary cells and defining a second subset of DRX parameters to be unique to the respective primary and secondary cells.

14. The apparatus of claim 13, wherein
the circuitry is configured to define the active states of the primary and secondary cells by defining different inactivity timers for the primary and secondary cells.

15. The apparatus of claim 14, wherein
the circuitry is configured to define different inactivity timers by defining an inactivity timer for the secondary cell that is smaller than an inactivity timer for the primary cell.

16. The apparatus of claim 15, wherein
the circuitry is configured to define the inactivity timer for the secondary cell by setting the inactivity timer for the secondary cell equal to zero.

17. The apparatus of claim 13, wherein
the circuitry is configured to define the active states of the primary and secondary cells by defining an on-duration timer of the primary cell to be equal to an on-duration timer of the secondary cell.

18. The apparatus of claim 13, wherein
the first subset of discontinuous reception (DRX) parameters common to both the primary and secondary cells include at least one of a DRX cycle, an on-duration timer, a DRX short cycle or a DRX short cycle timer.

19. The apparatus of claim 13, wherein the second subset of discontinuous reception (DRX) parameters that are unique to the respective primary and secondary cells include at least one of a DRX activity timer or a DRX re-transmission timer.

* * * * *